(12) United States Patent
Vu et al.

(10) Patent No.: US 8,484,106 B1
(45) Date of Patent: Jul. 9, 2013

(54) OPT-OUT PAYROLL

(75) Inventors: Miriam Nga-Shun Vu, San Francisco, CA (US); Charles Shieh, Cupertino, CA (US); Lucinda Kathryn Foss, San Francisco, CA (US); Lesley K. Grossblatt, San Francisco, CA (US); Sandra Marie Edwards, Sunnyvale, CA (US)

(73) Assignee: Intuit Inc., Mountain View, CA (US)

( * ) Notice: Subject to any disclaimer, the term of this patent is extended or adjusted under 35 U.S.C. 154(b) by 292 days.

(21) Appl. No.: 12/712,138

(22) Filed: Feb. 24, 2010

(51) Int. Cl.
*G07F 19/00* (2006.01)
(52) U.S. Cl.
USPC .............. 705/31; 70/19; 70/30; 70/32; 70/40
(58) Field of Classification Search
USPC .......................................... 705/19, 30, 32, 40
See application file for complete search history.

(56) References Cited

U.S. PATENT DOCUMENTS

| | | | | |
|---|---|---|---|---|
| 6,898,573 | B1 * | 5/2005 | Piehl ................................ | 705/31 |
| 6,912,508 | B1 * | 6/2005 | McCalden et al. ............. | 705/31 |
| 7,685,032 | B2 * | 3/2010 | Zias et al. ....................... | 705/31 |
| 7,716,094 | B1 * | 5/2010 | Sutter et al. ..................... | 705/31 |
| 7,801,813 | B2 * | 9/2010 | Brown et al. ................... | 705/39 |
| 7,971,141 | B1 * | 6/2011 | Quinn et al. .................. | 715/721 |
| 2003/0216978 | A1 * | 11/2003 | Sweeney et al. ............... | 705/30 |
| 2007/0162456 | A1 * | 7/2007 | Agassi et al. .................. | 707/10 |
| 2008/0077503 | A1 * | 3/2008 | Zias et al. ....................... | 705/19 |
| 2009/0070169 | A1 * | 3/2009 | Cohen .............................. | 705/7 |

OTHER PUBLICATIONS http://payroll.intuit.com/payroll_resources/payroll_101/index.jsp Intuit; Payroll 101; Jun. 21, 2008.*

* cited by examiner

*Primary Examiner* — Fateh Obaid
(74) *Attorney, Agent, or Firm* — Osha Liang LLP

(57) ABSTRACT

The invention relates to a method for processing a payroll. The method steps include obtaining a compliance rule of a tax agency regarding the payroll, obtaining an update of a payroll parameter from a financial management application (FMA), analyzing the update of the payroll parameter based on the compliance rule of the tax agency to detect a schedule changing event, adjusting the payment schedule of the tax agency based on the schedule changing event to generate an adjusted payment schedule of the tax agency, submitting the adjusted payment schedule of the tax agency and an amount of the payment to the tax agency to a user for approval, accessing a payroll tax paying website of the tax agency, and making the payment to the tax agency using the payroll tax paying website in response to receiving the approval from the user.

20 Claims, 7 Drawing Sheets

Important! Automated Payroll Change Alert

Dear <business owner name>:

Because you have accumulated $2,500.00 in Federal payroll taxes, the IRS requires you now pay your taxes monthly instead of quarterly. We have already updated your payment frequency for you in your payroll subscription. You can now expect to see your payments will be due at the end of each month. Your reminders have been updated to reflect this.

~ The Online Payroll Team

Screenshot 300b

FIGURE 3B

Screenshot 300c

FIGURE 3C

OPT-OUT PAYROLL

BACKGROUND

Generally speaking when operating a company to conduct businesses, an employer needs to file taxes, whether the company made a profit or not. The company is responsible for Federal, state, and local taxes for the businesses. The company is also responsible for social security, Medicare, and unemployment taxes for each of its employees, regardless of how long the employee has worked for the company. Paying business taxes falls into two separate categories: taxes paid throughout the year, and taxes paid at the end of the year. Throughout the year, the company is responsible for payroll taxes that include Federal, local, and state imposed employee withholdings as well as social security, Medicare, and unemployment taxes. Agency imposed employee withholding is withdrawn from every employee paycheck when it is issued. At the end of the year, the company is responsible for reporting its overall income, along with any losses or gains. The taxes, if owed, can be paid online over the Internet, or by mailing a check to a tax agency. Various tax agencies (e.g., the Internal Revenue Service (IRS), state tax agencies, regional and local tax agencies, etc.) issue compliance requirements and rules regarding filing and paying business taxes including payroll taxes.

For example, the IRS uses the term "tax deposit" to mean "tax payment", the term "monthly depositor" or "semi-weekly depositor" to mean "monthly payer" or "semi-weekly payer", and the term "deposit schedule" to mean "payment schedule". Before a business entity can determine when the tax payment is due, the business entity must first determine if it is a monthly depositor, or a semi-weekly depositor. In order to determine which schedule the business entity is on, the payroll records during the "lookback period" is examined. This period always runs from July 1 to June 30. For year 2006, the "lookback period" runs from Jul. 1, 2004 till Jun. 30, 2005. If the amount the business entity withheld for Federal payroll tax (referred to herein as 941 tax) is $50,000 or less, the business entity is a monthly depositor. If the amount during that period is more than $50,000, the business entity is a semi-weekly depositor.

If the business entity is a monthly depositor, the business entity is required to pay the taxes by the 15th of the next month. For example, the payment for Federal 941 tax withheld during August 2006 would be due on Friday, Sep. 15, 2006. If the 15th falls on a weekend or Federal holiday, the payment is due the next business day.

If the business entity is a semi-weekly depositor, the payment due date is as follows. If the payday falls on a Wednesday, Thursday, and/or Friday, the deposit is due on or before the following Wednesday. If the payday falls on a Saturday, Sunday, Monday, and/or Tuesday, the deposit is due on or before the following Friday.

For the 941 taxes, if the business entity is a monthly depositor and accumulates less than $2,500 in taxes for the month, the payment amount may be rolled over into the next month. The taxes become due, the 15th day of the month following the month in which the total surpasses the $2,500 limit.

Regardless of which type of depositor the business entity is, if Federal 941 withholdings for one day reach $100,000 or more, the monthly/semi-weekly deposit rules are accelerated and the payment is due the next business day. From that point forward, the business entity is required to pay all taxes on the semi-weekly schedule. This rule is referred to as the "$100,000" rule. Furthermore, if a late payment is made, the penalties can be as high as 10% of the payment due plus interest.

For Federal 940 taxes, the total tax is paid at the end of each quarter however if the employers total tax due is less than 500.00, they can roll the amount due into the next quarter. With the payroll history and scheduled future payrolls, we could accurately predict when the taxes will be due as well as prevent them from paying too early or too late.

New York State Income tax has complex due dates which are often difficult to schedule. There are two deposit schedules based on total annual tax liability. The "5 day after payday" schedule is applicable if total annual income tax liability is less than $15,000 and requires the payment to be made within five business days following the payroll that caused the total accumulated tax withholdings to equal or exceed $700. The "3 day after payday" schedule is applicable if total annual income tax liability is more than $15,000 and requires the payment to be made within three business days following the payroll that caused the total accumulated tax withholdings to equal or exceed $700.

Small business administration (SBA) size standards define whether a business entity is small and, thus, eligible for government programs and preferences reserved for "small business" concerns. Size standards have been established for types of economic activity, or industry, generally under the North American Industry Classification System (NAICS). In NAICS and depending on the particular industry, a business entity employing less than a certain number (e.g., 500, 1000, etc.) of employees may be considered as SBA.

SUMMARY

In general, in one aspect, the invention relates to a method for processing a payroll. The method includes obtaining a compliance rule of a tax agency regarding the payroll, wherein the compliance rule of the tax agency relates to a payment to the tax agency according to a payment schedule of the tax agency, obtaining an update of a payroll parameter from a financial management application (FMA), wherein financial data of a business entity is managed using the FMA, analyzing, using a central processing unit (CPU), the update of the payroll parameter based on the compliance rule of the tax agency to detect a schedule changing event, adjusting, using the CPU, the payment schedule of the tax agency based on the schedule changing event to generate an adjusted payment schedule of the tax agency, submitting the adjusted payment schedule of the tax agency and an amount of the payment to the tax agency to a user for approval, accessing, using the CPU, a payroll tax paying website of the tax agency, and making the payment, using the CPU, to the tax agency using the payroll tax paying website in response to receiving the approval from the user.

In general, in one aspect, the invention relates to a method for processing a payroll. The method includes obtaining data to populate a financial management application (FMA) of a user, wherein the data comprises a payroll parameter, receiving a notification from a payroll agent, executing on a central processing unit (CPU), regarding a payment to a tax agency, and providing an approval of the payment to the tax agency in response to receiving the notification, wherein the payroll agent is configured to obtain a compliance rule of the tax agency regarding the payroll, obtain the payroll parameter from the FMA, determine, using the CPU, a payment schedule of the tax agency based on the payroll parameter and the compliance rule of the tax agency, obtain an update of the payroll parameter from the FMA, determine, using the CPU, an amount of the payment to the tax agency based on the update of the payroll parameter, analyze, using the CPU, the update of the payroll parameter based on the compliance rule of the tax agency to detect a schedule changing event, adjust, using the CPU, the payment schedule of the tax agency based on the schedule changing event to generate an adjusted payment schedule of the tax agency, submit the notification to the user for approval, wherein the notification comprises the amount of the payment to the tax agency and the adjusted payment schedule of the tax agency, access, using the CPU, a payroll tax paying website of the tax agency, and make the payment, using the CPU, to the tax agency using the payroll tax paying website in response to receiving the approval from the user.

In general, in one aspect, the invention relates to a system for processing a payroll. The system includes a financial management application (FMA), wherein a user manages financial data of a business entity using the FMA, a payroll agent operatively coupled to the FMA and executing on a central processing unit (CPU). The payroll agent includes a payroll analyzer configured to analyze an update of a payroll parameter based on a compliance rule of a tax agency to detect a schedule changing event, adjust a payment schedule of the tax agency based on the schedule changing event to generate an adjusted payment schedule of the tax agency, and a user module configured to obtain the update of the payroll parameter from the FMA, and facilitate a payment to the tax agency for the business entity based on the adjusted payment schedule of the tax agency, and a repository storing the payroll parameter and the payment schedule of the tax agency.

In general, in one aspect, the invention relates to a computer readable medium storing instructions for processing a payroll. The instructions when executed by a computer comprises functionality to obtain a compliance rule of a tax agency regarding the payroll, wherein the compliance rule of the tax agency relates to a payment to the tax agency according to a payment schedule of the tax agency, obtain an update of a payroll parameter from a financial management application (FMA), wherein financial data of a business entity is managed using the FMA, analyze the update of the payroll parameter based on the compliance rule of the tax agency to detect a schedule changing event, adjust the payment schedule of the tax agency based on the schedule changing event to generate an adjusted payment schedule of the tax agency, submit the adjusted payment schedule of the tax agency and an amount of the payment to the tax agency to a user for approval, access a payroll tax paying website of the tax agency, and make the payment to the tax agency using the payroll tax paying website in response to receiving the approval from the user.

In general, in one aspect, the invention relates to a computer readable medium storing instructions for processing a payroll. The instructions when executed by a computer comprises functionality to obtain data to populate a financial management application (FMA) of a user, wherein the data comprises a payroll parameter, receive a notification from a payroll agent regarding a payment to a tax agency, and provide an approval of the payment to the tax agency in response to receiving the notification, wherein the payroll agent is configured to obtain a compliance rule of the tax agency regarding the payroll, obtain the payroll parameter from the FMA, determine a payment schedule of the tax agency based on the payroll parameter and the compliance rule of the tax agency, obtain an update of the payroll parameter from the FMA, determine an amount of the payment to the tax agency based on the update of the payroll parameter, analyze the update of the payroll parameter based on the compliance rule of the tax agency to detect a schedule changing event, adjust the payment schedule of the tax agency based on the schedule changing event to generate an adjusted payment schedule of the tax agency, submit the notification to the user for approval, wherein the notification comprises the amount of the payment to the tax agency and the adjusted payment schedule of the tax agency, access a payroll tax paying website of the tax agency, and make the payment to the tax agency using the payroll tax paying website in response to receiving the approval from the user.

Other aspects of the invention will be apparent from the following description and the appended claims.

BRIEF DESCRIPTION OF DRAWINGS

FIGS. 3A, 3B, and 3C depict screenshots of an application example in accordance with one or more embodiments of the invention.

DETAILED DESCRIPTION

Figure 1:
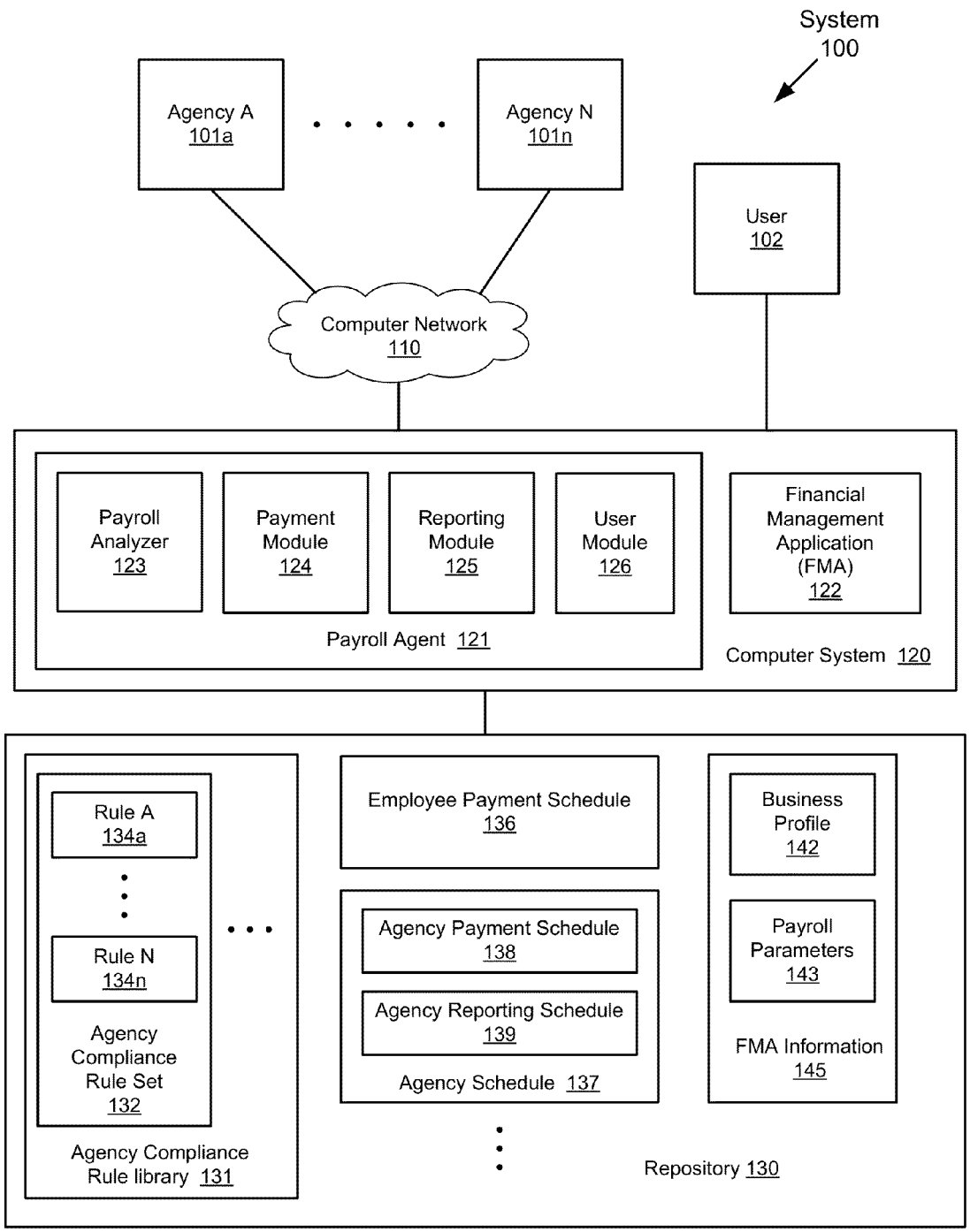
FIG. 1 depicts a schematic block diagram of a system in accordance with one or more embodiments of the invention.

Specific embodiments of the invention will now be described in detail with reference to the accompanying Figures. Like elements in the various Figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Small business owners generally want to do as little as possible in order to get their payroll tasks done. In general, embodiments of the invention relates to a system and method that takes advantage of low complexity in payrolls of really small businesses (e.g., with less than 50 employees and no benefits) to allow many of the payroll tasks (e.g., payroll runs, paying taxes, filing forms) to be performed in an automatic manner requiring no user intervention. In particular, once the user (e.g., small business owner or SBO) has set up payroll, the payroll system of the present invention will run all payroll tasks unless the user specifically indicates otherwise. Such opt-out payroll service can email the user a summary of payment and/or a copy of the filing on his/her behalf prior to execution of such payment and/or filing. If the payment and/or filing are acceptable as is, the user does nothing and the opt-out payroll service will perform the task at the time required for compliance. If changes are necessary, the user can inform the service to hold off for necessary changes to be made in the system before the task is performed. In current practice, traditional outsourced payroll is acting on behalf of the user. As a result, the power of attorney is required in order to prepare and file tax forms, which is a manual system that requires human intervention to initiate payroll transactions. In contrast, opt-out payroll of the present invention triggers and conducts transactions automatically without human intervention. Further, no impound funds are required by the outsourced service for taxes and therefore the user retains control over the cash flow.

FIG. 1 depicts a schematic block diagram of a system (100) in accordance with one or more embodiments of the invention. In one or more embodiments of the invention, one or more of the modules and elements shown in FIG. 1 may be omitted, repeated, and/or substituted. Accordingly, embodiments of the invention should not be considered limited to the specific arrangements of modules shown in FIG. 1.

As shown in FIG. 1, the system (100) includes tax agencies (e.g., agency A (101a), agency N (101n), etc.) and computer system (120) coupled via computer network (110). For example, the computer network (110) may include wired and/or wireless portions of the Internet and/or other data communications networks. Further, the computer system (120) is installed with financial management application (FMA) (122) and payroll agent (121) having payroll analyzer (123), payment module (124), reporting module (125), and user module (126). Furthermore, the system (100) includes repository (130) coupled to the computer system (120) for storing employee payment schedule (136), one or more agency schedules (e.g., agency schedule (137), etc.) including agency payment schedules (e.g., agency payment schedule (138)) and agency reporting schedules (e.g., agency reporting schedule (139)), agency compliance rule library including one or more agency compliance rule sets (e.g., agency compliance rule set (132), etc.) each associated with one of the tax agencies (e.g., agency A (101a), agency N (101n), etc.) and having a set of rules (e.g., rule A (134a), rule N (134n), etc.), and FMA information (145) including business profile (142) and payroll parameters (143). In addition, the system (101) includes user (102) associated with an business entity (not shown) of which business operations are managed using the FMA (122). Generally speaking, the user (102) may be an individual such as a sole proprietor and/or small business owner (SBO) of the business entity (not shown) or an individual employed by or otherwise associated with the business entity (not shown).

In one or more embodiments of the invention, the FMA (122) is configured to manage operations of the business entity (not shown) based on the FMA information (145) stored in the repository (130). For example, the FMA (122) may be an accounting software, an order entry and inventory control software, or other types of business financial management software. The business profile (142) may include information describing a business type, number of employees, small business status, etc. of the business entity (not shown). The payroll parameters (143) may include employee salaries, bonuses, benefits, withholding status (e.g., marital status, number of dependents, etc. of employees), accrued withholding amount, pay period, taxation period, or other employee compensation related information. In one or more embodiments of the invention, the employee payment schedule (136) includes salary and bonus payment dates. In one or more embodiments, the employee payment schedule (136) may be included in the payroll parameters (143).

In one or more embodiments of the invention, the payroll agent (121) or a portion thereof may be a stand alone software in communication with the FMA (122), a user installable add-on module of the FMA (122), an optional functional module within the FMA (122), or a standard feature built-in within the FMA (122). In one or more embodiments of the invention, the payroll agent (121) may be provided by a provider of the FMA (122) or by a third party separate from the provider of the FMA (122).

In one or more embodiments of the invention, the computer system (120) may be operated by the user (102) for accessing functionalities of the FMA (122) and the payroll agent (121). In one or more embodiments, the computer system may be operated by an application service provider offering services using which the user (102) may access the functionalities of the FMA (122) and the payroll agent (121).

In one or more embodiments of the invention, the agency schedule (137) includes a agency payment schedule (138) (e.g., payroll tax deposit schedule) and/or an agency reporting schedule (139) (e.g., payroll tax reporting schedule). In one or more embodiments, such agency schedule (137) and an amount of the payment paid to the agency according to the agency schedule (137) may be pre-determined. For example, the agency payment schedule (138), the agency reporting schedule (139), and/or a payroll tax deposit amount (not shown) may be determined by the user (102) (e.g., a SBO or an accountant) during initial set up of the payroll.

In one or more embodiments of the invention, the payroll agent (121) includes the user module (126) that is configured to obtain the payroll parameters (143) from the FMA (122). In one or more embodiments of the invention, the payroll agent (121) includes the payroll analyzer (123) that is configured to determine the agency schedule (137) and/or the amount of the payment paid to the agency based on the payroll parameters (143) and a compliance rule (e.g., rule A (134a), rule N (134n), etc.) of a tax agency (e.g., IRS). For example, the payroll parameters (143) may include salary information and Federal withholding status of the employees while the payroll analyzer (123) determines the Federal 941 tax deposit schedule and Federal 941 tax deposit amount based on such salary information and withholding status of the employees as well as applicable compliance rules of Federal 941 tax.

In one or more embodiments of the invention, the user module (126) is further configured to obtain an update of the payroll parameters (143) from the FMA (122). For example, such update may be a result of salary adjustment or withholding status change of an existing employee or payroll addition due to a newly hired employee. Because such changes may change Federal 941 tax deposit amount, accordingly the monthly deposit, bi-weekly deposit, rollover, or accelerated deposit status may change as a result of such update of the payroll parameters (143). In one or more embodiments, the user module (126) is configured to monitor the payroll parameters (143) to detect the update when a change is made to the payroll parameters (143) within the FMA (122) (e.g., a change in employee salaries, bonuses, benefits, withholding status such as marital status, number of dependents, etc. of employees, accrued withholding amount, pay period, taxation period, or other employee compensation related information. In one or more embodiments, the FMA (122) is configured to notify the user module (126) and provide the update when a change is made to the payroll parameters (143) within the FMA (122).

In one or more embodiments of the invention, the payroll analyzer (123) is further configured to analyze the update of the payroll parameters (143) based on the compliance rule (e.g., rule A (134a), rule N (134n), etc.) of the tax agency (e.g., IRS) to detect a schedule changing event and adjust the agency payment schedule (138) in response to the schedule changing event. For example, the agency may be the IRS and the compliance rule A (134a) may be the Federal 941 tax deposit due date requirement based on the "lookback period". Another example compliance rule N (134n) may be the $100,000 rule for accelerating the Federal 941 tax deposit due date.

In one or more embodiments, the payroll analyzer (123) is configured to analyze Federal 941 withholdings in the lookback period (e.g., as compared to that of a prior year) and determine, as the schedule changing event, whether it exceeds the threshold (e.g., $50,000) causing a change in the status of monthly or semi-weekly depositor. In one or more embodiments, the payroll analyzer (123) is configured to analyze current Federal 941 withholdings and determine, as the schedule changing event, whether it exceeds another threshold (e.g., $100,000) causing a change in the acceleration of monthly or semi-weekly deposit schedule. In one or more embodiments, analysis of the Federal 941 withholdings in the lookback period or current period may be performed in response to the aforementioned update. In one or more embodiments, analyzing the Federal 941 withholdings in the lookback period or current period includes analyzing how the aforementioned update of the payroll parameters (143) may affect the agency schedule (137), i.e., whether the update is a schedule changing event. Once the schedule changing event is detected, the agency schedule (137) may be adjusted according to the requirement of the corresponding compliance rule (e.g., rule A (134a), rule N (134n), etc.). For example, the agency payment schedule (138) or the agency reporting schedule (139) may be adjusted as required.

In one or more embodiments of the invention, the user module (126) is further configured to facilitate a payment to the agency (e.g., agency A (101a), agency N (101n), etc.) for the business entity (not shown) according to the agency payment schedule (138), which may be pre-determined when the payroll is initially set up or adjusted in response to an update in the payroll parameters (143). In one or more embodiments, the user module (126) is configured to send a notification to the user (102) including an agency payment schedule (138) and the amount of the payment to the agency prior to the due date of the payment. In one or more embodiments, the notification is sent to the user (102) in response to the aforementioned update of the payroll parameters (143) causing the agency payment schedule (138) to be adjusted.

In one or more embodiments of the invention, the user module (126) is configured to receive an approval from the user (102) in response to sending the notification. For example, the user (102) may review the agency payment schedule (138) and the amount of the payment as received from the user module (126) and determine that they are acceptable and approved. Otherwise, necessary changes may be made to the agency payment schedule (138) and the amount of the payment before the user (102) sends the approval to the user module (126).

In one or more embodiments of the invention, the payroll agent (121) includes the payment module (124) that is configured to access a payroll tax paying website of the agency and make the payment to the agency using the payroll tax paying website in response to receiving the approval from the user. For example, the payroll tax paying website may accept payments in the form of electronic check, account debit, credit card, etc. In one or more embodiments, such payment method may be arranged when an account is set up for the user (102) at the payroll tax paying website of the agency. In one or more embodiments, the payment module (124) is configured to access the account automatically on behalf of the user (102) upon receiving the approval from the user (102) to proceed with the payment according to the agency payment schedule (138). In one or more embodiments, the authentication credentials for accessing the account may be stored in the repository (130) as part of the payroll parameters (143). In one or more embodiments, the payment module (124) is configured to retrieve such authentication credentials directly. In one or more embodiments, the payment module (124) is configured to retrieve such authentication credentials via the FMA (122).

In one or more embodiments of the invention, the payroll analyzer (123) is configured to determine net payment amounts to the employees based on the payroll parameters (143) and the aforementioned payroll tax withholdings. For example, the payroll parameters (143) may include salary information and Federal withholding status of the employees while the payroll analyzer (123) determines the net payment to each of the employees based on such salary information and withholding status of the employees.

In one or more embodiments of the invention, the user module (126) is configured to send a notification to the user (102) including the net payment amounts prior to the payment date of the employee payment schedule (136). In one or more embodiments, the user module (126) is configured to receive an approval from the user (102) in response to sending the notification. For example, the user (102) may review the net payment amounts as received from the user module (126) and determine that they are acceptable and approved. Otherwise, necessary changes may be made to the net payment amounts before the user (102) send the approval to the user module (126).

In one or more embodiments of the invention, the payment module (124) that is configured to access a bank website of each of the employee and make the salary payment to the employee using the bank website in response to receiving the approval from the user (102). For example, the bank website may accept the salary payment in the form of a direct deposit. In one or more embodiments, such direct deposit may be arranged when the payroll is set up initially. In one or more embodiments, the payment module (124) is configured to access the bank account automatically on behalf of the user (102) upon receiving the approval from the user (102) to proceed with the salary payment according to the employee payment schedule (136). In one or more embodiments, the bank account information (e.g., ABA number and account number) for making the direct deposit may be stored in the repository (130) as part of the payroll parameters (143). In one or more embodiments, the payment module (124) is configured to retrieve such bank account information directly. In one or more embodiments, the payment module (124) is configured to retrieve such bank account information via the FMA (122).

In one or more embodiments of the invention, the payroll analyzer (123) is configured to determine the agency reporting schedule (139) as well as how to populate a payroll tax report based on the payroll parameters (143) and a compliance rule (e.g., rule A (134a), rule N (134n), etc.) of a tax agency (e.g., IRS). For example, the payroll parameters (143) may include salary information and Federal withholding status of the employees while the payroll analyzer (123) determines the Federal 941 tax reporting schedule and populates the Federal 941 tax report based on such salary information and withholding status of the employees as well as applicable compliance rules of Federal 941 tax.

In one or more embodiments of the invention, the user module (126) is configured to send a notification to the user (102) including the agency reporting schedule (139) and the payroll tax report prior to the due date of the reporting schedule. In one or more embodiments, the user module (126) is configured to receive an approval from the user (102) in response to sending the notification. For example, the user (102) may review the agency reporting schedule (139) and the payroll tax report as received from the user module (126) and determine that they are acceptable and approved. Otherwise, necessary changes may be made to the agency reporting schedule (139) and the payroll tax report before the user (102) send the approval to the user module (126).

In one or more embodiments of the invention, the payroll agent (121) includes the reporting module (125) that is configured to access a payroll tax filing website of the agency and submit the payroll tax report to the agency using the payroll tax filing website in response to receiving the approval from the user (102). In one or more embodiments, the reporting module (125) is configured to access an account set up for the user (102) at the payroll tax filing website automatically on behalf of the user (102) upon receiving the approval from the user (102) to proceed with the filing according to the agency reporting schedule (139). In one or more embodiments, the authentication credentials for accessing the account may be stored in the repository (130) as part of the payroll parameters (143). In one or more embodiments, the reporting module (125) is configured to retrieve such authentication credentials directly. In one or more embodiments, the reporting module (125) is configured to retrieve such authentication credentials via the FMA (122)

Figure 2A:
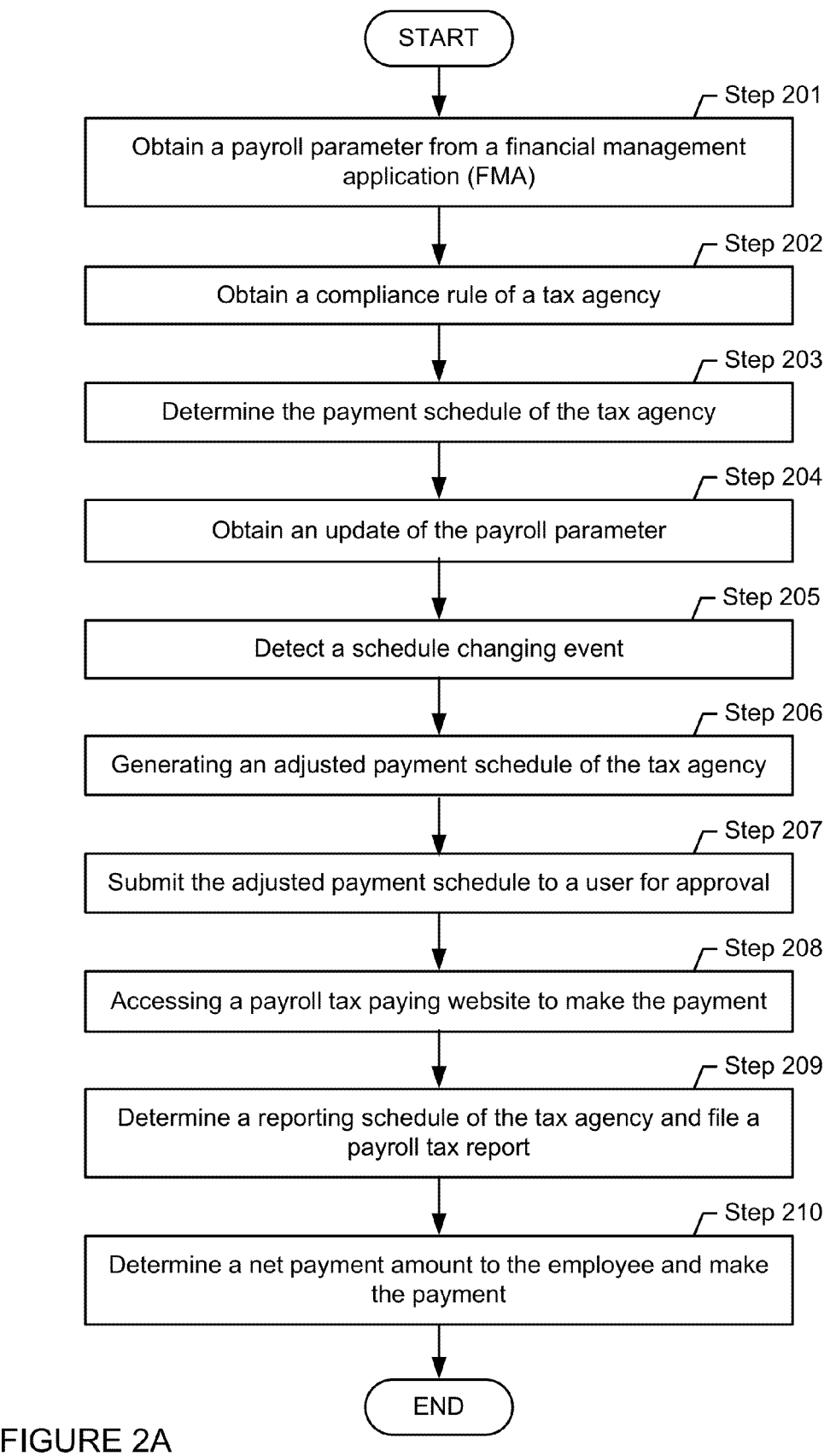
FIGS. 2A and 2B depict flowcharts of methods in accordance with one or more embodiments of the invention.
Figure 2B:
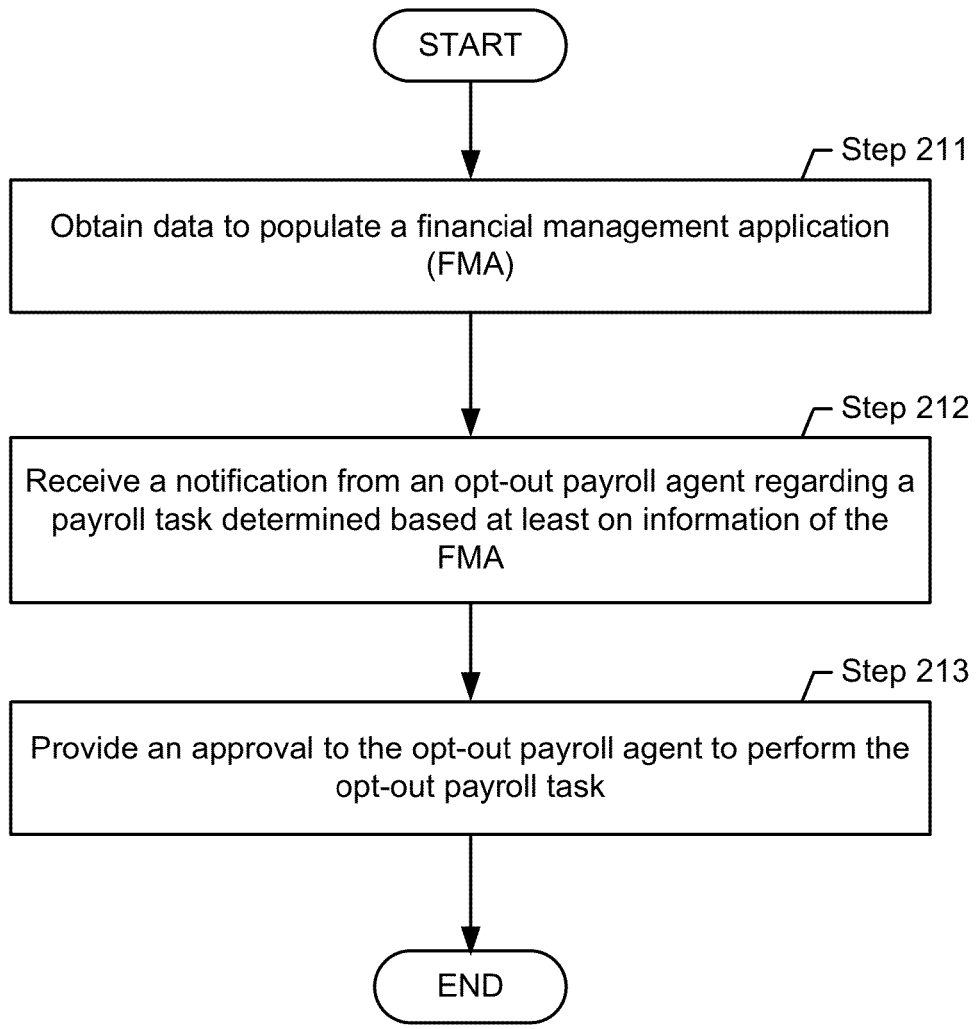

FIGS. 2A and 2B depicts flowcharts of methods in accordance with one or more embodiments of the invention. In one or more embodiments of the invention, one or more of the steps shown in FIGS. 2A and 2B may be omitted, repeated, and/or performed in a different order. Accordingly, embodiments of the invention should not be considered limited to the specific arrangements of steps shown in FIGS. 2A and 2B.

The method depicted in FIG. 2A is from a system perspective and may be practiced using system (100) described with respect to FIG. 1 above. Initially in Step 201, a payroll parameter is obtained from a financial management application (FMA). As noted above, the FMA may be an accounting software, an order entry and inventory control software, or other types of business financial management software used by a business entity while the payroll parameter may include employee salary, bonus, benefit, withholding status (e.g., marital status, number of dependents, etc.), accrued withholding amount, pay period, taxation period, or other employee compensation related information of the business entity.

In Step 202, a compliance rule of a tax agency regarding the payroll is obtained that relates to a payment to the tax agency according to a payment schedule of the tax agency. For example, the tax agency may be IRS, the compliance rule may be related to the monthly, bi-weekly, rollover, or accelerated Federal payroll tax deposit schedule, the payment may be the Federal 941 payroll tax deposit, and the payment schedule may be the Federal 941 payroll tax deposit schedule.

In Step 203, the payment schedule of the tax agency is determined based on the payroll parameter and the compliance rule of the tax agency. In one or more embodiments, the payroll parameter includes a salary of an employee, a bonus of the employee, a withholding status of the employee, and a pay period of the business entity. For example, the payment schedule of the business entity may be determined to be bi-weekly, monthly, rollover, or accelerated based on the withholding amount of the business entity and the specific compliance rule requirements.

In Step 204, an update of a payroll parameter is obtained from the FMA. For example, the update of the payroll parameter may result from a new employee hiring or a salary adjustment of an existing employee.

In Step 205, a schedule changing event is detected by analyzing the update of the payroll parameter based on the compliance rule of the tax agency. For example, a withholding amount for the tax agency may be estimated based on the update of the payroll parameter while a threshold may be determined based on the compliance rule of the tax agency. Accordingly, the withholding amount and the threshold may be compared to detect the schedule changing event that may cause the payment schedule to change, for example from monthly deposit schedule to bi-weekly deposit schedule.

In Step 206, an adjusted payment schedule is generated by adjusting the payment schedule of the tax agency based on the schedule changing event. As described above, the monthly deposit schedule may be adjusted to bi-weekly deposit schedule.

In Step 207, the adjusted payment schedule of the tax agency and an amount of the payment to the tax agency is submitted to a user for approval. For example, the user may be an individual such as a sole proprietor and/or small business owner (SBO) of the business entity or an individual employed by or otherwise associated with the business entity.

In Step 208, a payroll tax paying website of the tax agency is accessed to make the payment in response to receiving the approval from the user. For example, the authentication information required to access the payroll tax paying website may be previously obtained from the user and stored for this purpose.

In general, the tax agencies set forth compliance rules for tax reporting in addition to tax payment deposit. In Step 209, a reporting schedule of the tax agency is determined based on the payroll parameter and the compliance rule of the tax agency. Further, the reporting schedule of the tax agency and a payroll tax report is submitted to the user for approval. Accordingly, a payroll tax filing website of the tax agency is accessed to submit the payroll tax report to the tax agency in response to receiving the approval from the user.

In Step 210, a net payment amount and a payment schedule of the employee is determined based on the payroll parameter. For example, the net payment amount may be calculated based on a base salary and a calculated agency withholding amount. Further, the net payment amount and the payment schedule are submitted to the user for approval. Accordingly, the net payment amount to the employee may be paid in response to receiving the approval from the user. For example, the net payment amount may be transferred to a bank designated by the employee for automatic salary deposit.

The method depicted in FIG. 2B is from a user perspective and may be practiced using system (100) described with respect to FIG. 1 above. Initially in Step 211, data is obtained to populate a financial management application (FMA) used by a user. As noted above, the FMA may be an accounting software, an order entry and inventory control software, or other types of business financial management software used by a business entity while the data may include a payroll parameter such as employee salary, bonus, benefit, withholding status (e.g., marital status, number of dependents, etc.), accrued withholding amount, pay period, taxation period, or other employee compensation related information of the business entity. Further, the user may be an individual such as a sole proprietor and/or small business owner (SBO) of the business entity or an individual employed by or otherwise associated with the business entity.

In Step 212, a notification is received from a payroll agent regarding a payroll task determined based at least partly on information of the FMA. For example, the payroll task may be regarding making a payment to a tax agency and/or submitting a tax filing to the tax agency. In one or more embodiments of the invention, the payroll agent may be a stand alone software in communication with the FMA, a user installable add-on module of the FMA, an optional functional module within the FMA, or a standard feature built-in within the FMA. In one or more embodiments, the payroll agent may be provided by a provider of the FMA or by a third party separate from the provider of the FMA.

In Step 213, an approval (e.g., of the payment and/or filing to the tax agency) is provided by the user in response to receiving the notification. Accordingly, the payroll agent may perform the payroll task in response to the user approval. In one or more embodiments of the invention, the payroll agent access a tax paying website to make the tax payment and/or access a tax filing website of the tax agency to submit the tax filing based on the user approval.

Figure 3A:
Figure 3C:
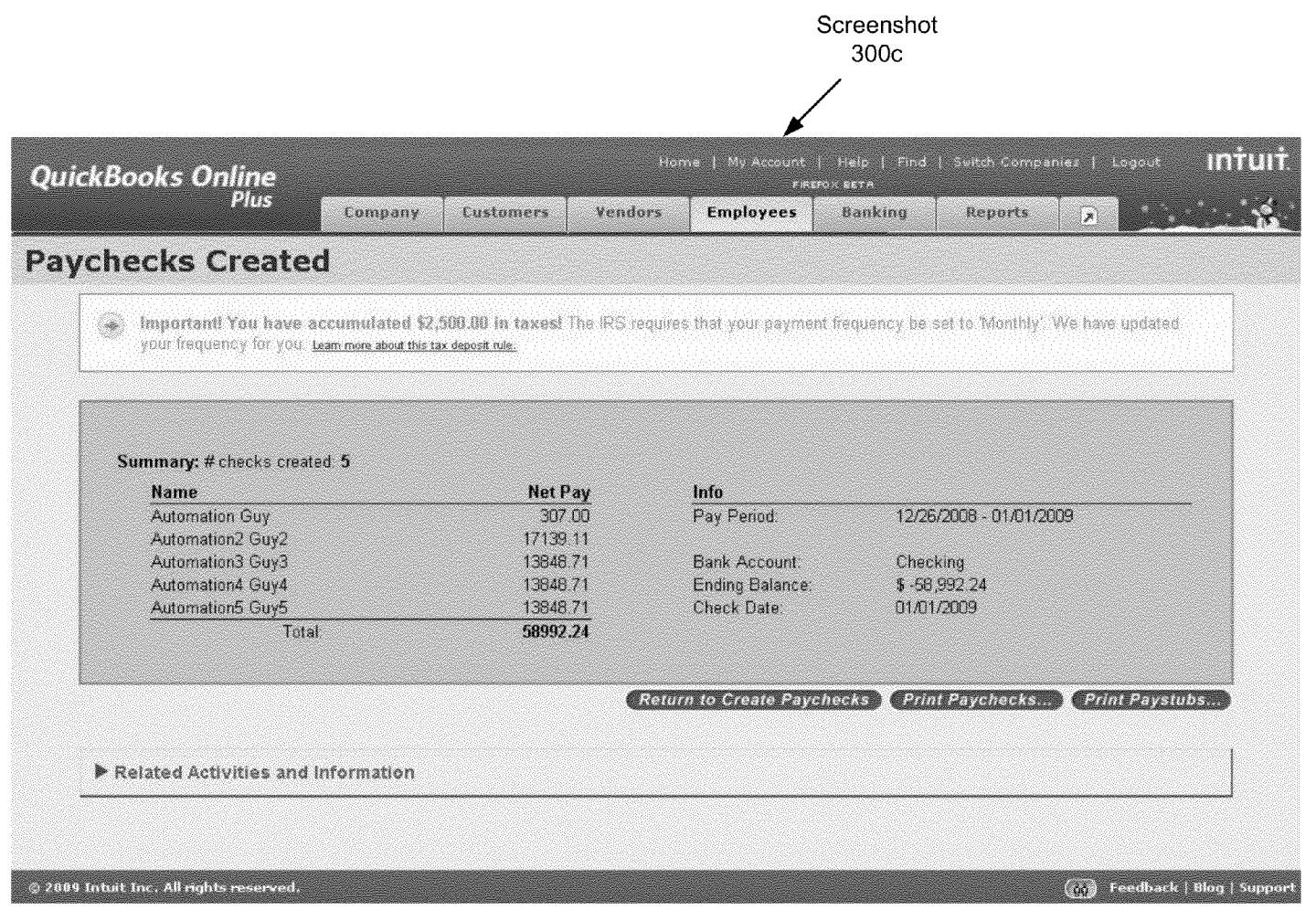

FIGS. 3A, 3B, and 3C depict screenshots of an application example in accordance with one or more embodiments of the invention.

As shown in FIG. 3A, the user sets up the payroll by specifying a pay schedule and entering pay interval and paycheck dating option selection. In addition, during the payroll set up, the ser may enter the typical work hours for each employee for each payroll run. The opt-out payroll service (i.e., the payroll agent described in reference to FIGS. 1, 2A, and 2B above) will run the payroll for that configuration unless instructed otherwise by the user. This scheme works particularly well for salaried situations. For situations where the hours vary, an interface may be where employees/SBOs are asked to submit hours by a particular date & time, and payroll is run only for those submitted hours for that payroll run.

As discussed above, the opt-out payroll service keeps track of all payroll taxes owed and the deadlines by which they need to be paid. The SBO will have set up ePay (electronic pay) and entered appropriate PIN/password information into the opt-out payroll service so taxes can be automatically e-paid on their behalf by the service. If the tax agency does not accept e-payments yet, the payment may be made via online banking service of the business. In addition, because the opt-out payroll service keeps track of all payroll runs and liabilities paid, it can also file the appropriate payroll forms at the required time on behalf of the SBO. All the SBO has to do is to enroll in e-file (electronic filing) with the appropriate tax agencies (as necessary) and save all PIN/Password info in the opt-out payroll service. W-2 forms can also be automatically generated at the end of the year, filed with the IRS, and mailed to employees. If the tax agency does not offer e-filing, the tax forms may be generated by the opt-out payroll service then mailed by the third party provider who provides the opt-out payroll service to the SBO.

FIG. 3B shows a message (e.g., email message) automatically sent to the SBO by the opt-out payroll service upon detecting a schedule changing event. As shown, the message is addressed by "The Online Payroll Team" that delivers the full service image backed by the automated payroll agent. FIG. 3C shows the same message displayed in the payroll module of the FMA when the opt-out payroll service presents the payroll for SBO approval.

In summary, SBO would setup payroll as they do traditionally by providing necessary company and employee information. Once complete, the SBO is asked if it is authorized to have the payroll run automatically. Before a payroll transaction (e.g., paying an employee, paying a tax, filing a tax form to the tax agency) is made, the SBO will be notified and can review, edit or cancel the transaction.

Figure 4:
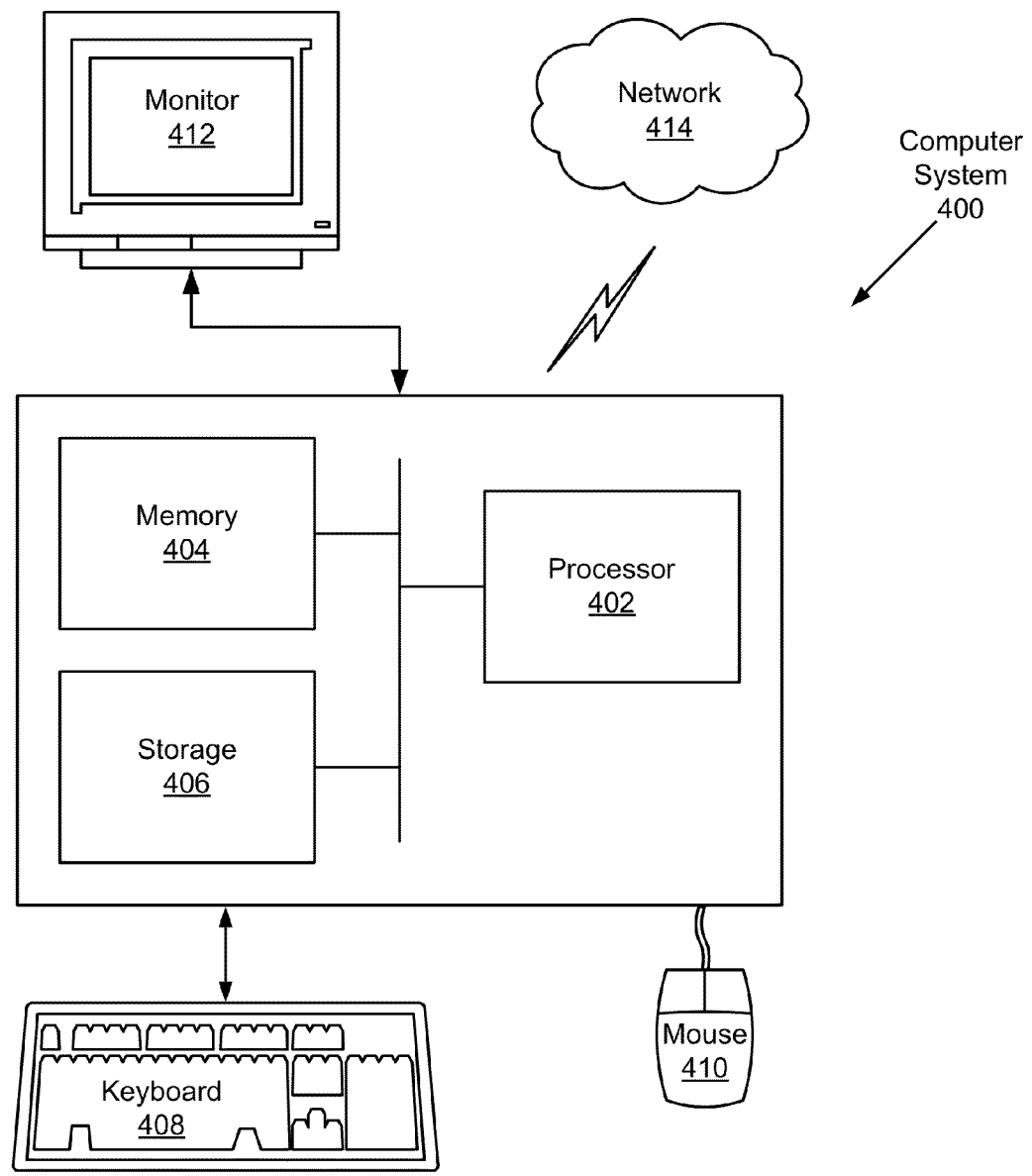
FIG. 4 depicts a computer system in accordance with one or more embodiments of the invention.

Embodiments of the invention may be implemented on virtually any type of computer regardless of the platform being used. For example, as shown in FIG. 4, a computer system (400) includes one or more processor(s) (402), associated memory (404) (e.g., random access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor ((412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other similar type of network)) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various elements of the computer system (120), the repository (130), etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While certain agency compliance rules are used as examples in the description above, those skilled in the art will appreciated, with the benefit of this disclosure, that the system and method of the invention may apply to other agencies or other compliance rules without deviating from the spirit of the invention. While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for processing a payroll of a business entity, comprising:
    obtaining a compliance rule of a tax agency regarding the payroll, wherein the compliance rule of the tax agency relates to a payment to the tax agency according to a payment schedule of the tax agency;
    receiving a salary payment schedule from a user;
    performing, by a central processing unit (CPU) and based on a one-time authorization from the user, recurring payroll tasks comprising:
        a first plurality of automatic recurring salary payments to each employee of the business entity according to the salary payment schedule; and
        a first plurality of automatic recurring payroll tax deposits each comprising the payment to the tax agency according to the payment schedule of the tax agency,
        wherein the first plurality of automatic recurring salary payments and the first plurality of automatic recurring payroll tax deposits are performed without further user intervention subsequent to the one time authorization;
    obtaining an update of an employee salary from a financial management application (FMA), wherein financial data of the business entity is managed using the FMA;

analyzing the update based on the compliance rule of the tax agency to detect a schedule changing event;

adjusting, using the CPU, the payment schedule of the tax agency based on the schedule changing event to generate an adjusted payment schedule of the tax agency;

submitting—the adjusted payment schedule of the tax agency to the user for approval; and further performing, in response to receiving the approval from the user, the recurring payroll tasks comprising:
  a second plurality of automatic recurring salary payments to each employee of the business entity according to the salary payment schedule; and
  a second plurality of automatic recurring payroll tax deposits each comprising an adjusted payment to the tax agency according to the adjusted payment schedule of the tax agency,
    wherein the second plurality of automatic recurring salary payments and the second plurality of automatic recurring payroll tax deposits are performed without further user intervention subsequent to the one time authorization and the approval from the user.

2. The method of claim 1, further comprising:
obtaining a payroll parameter from the FMA; and
determining the payment schedule of the tax agency based on the payroll parameter and the compliance rule of the tax agency.

3. The method of claim 1,
wherein the update results from at least one selected from a group consisting of a new employee hiring and a salary adjustment.

4. The method of claim 1, further comprising:
estimating a withholding amount for the tax agency based on the update;
determining a pre-determined threshold based on the compliance rule of the tax agency;
comparing the withholding amount and the pre-determined threshold to generate a comparison; and
detecting the schedule changing event based on the comparison.

5. The method of claim 1, further comprising:
determining a reporting schedule of the tax agency based on the update and the compliance rule of the tax agency;
submitting the reporting schedule of the tax agency and a payroll tax report to the user for approval;
accessing, using the CPU, a payroll tax filing website of the tax agency; and
submitting, using the CPU, the payroll tax report to the tax agency using the payroll tax filing website in response to receiving the approval from the user.

6. The method of claim 1, further comprising:
determining the adjusted payment based on the update; and
submitting the adjusted payment to the user for approval.

7. A method for processing a payroll of a business entity, comprising:
obtaining data to populate a financial management application (FMA) of a user, wherein the data comprises an employee salary of the business entity;
receiving a notification from a payroll agent, executing on a central processing unit (CPU), regarding a payment to a tax agency; and
providing an approval of the payment to the tax agency in response to receiving the notification,
wherein the payroll agent is configured to:
  obtain a compliance rule of a tax agency regarding the payroll, wherein the compliance rule of the tax agency relates to the payment to the tax agency according to a payment schedule of the tax agency;
  receive a salary payment schedule from the user;
  perform, by the CPU and based on a one-time authorization from the user, recurring payroll tasks comprising:
    a first plurality of automatic recurring salary payments to each employee of the business entity according to the salary payment schedule; and
    a first plurality of automatic recurring payroll tax deposits each comprising the payment to the tax agency according to the payment schedule of the tax agency,
      wherein the first plurality of automatic recurring salary payments and the first plurality of automatic recurring payroll tax deposits are performed without further user intervention subsequent to the one time authorization;
  obtain an update of the employee salary from the FMA;
  analyze the update based on the compliance rule of the tax agency to detect a schedule changing event;
  adjust, using the CPU, the payment schedule of the tax agency based on the schedule changing event to generate an adjusted payment schedule of the tax agency;
  submit the adjusted payment schedule of the tax agency to the user for approval; and
  further perform, in response to receiving the approval from the user, the recurring payroll tasks comprising:
    a second plurality of automatic recurring salary payments to each employee of the business entity according to the salary payment schedule; and
    a second plurality of automatic recurring payroll tax deposits each comprising an adjusted payment to the tax agency according to the adjusted payment schedule of the tax agency,
      wherein the second plurality of automatic recurring salary payments and the second plurality of automatic recurring payroll tax deposits are performed without further user intervention subsequent to the one time authorization and the approval from the user.

8. A system for processing a payroll, comprising:
a financial management application (FMA), wherein a user manages financial data of a business entity using the FMA;
a payroll agent operatively coupled to the FMA and executing on a central processing unit (CPU), comprising:
  a payment module configured to perform, based on a one-time authorization from the user, recurring payroll tasks comprising:
    a first plurality of automatic recurring salary payments to each employee of the business entity according to a salary payment schedule; and
    a first plurality of automatic recurring payroll tax deposits each comprising a payment to the tax agency according to a payment schedule of the tax agency,
      wherein the first plurality of automatic recurring salary payments and the first plurality of automatic recurring payroll tax deposits are performed without further user intervention subsequent to the one time authorization;
  a payroll analyzer configured to:
    analyze an update of an employee salary based on a compliance rule of a tax agency to detect a schedule changing event;
    adjust the payment schedule of the tax agency based on the schedule changing event to generate an adjusted payment schedule of the tax agency; and a user module configured to:
obtain the salary payment schedule from the user;
obtain the update from the FMA; and
submit the adjusted payment schedule of the tax agency to the user for approval,
wherein the payment module further performs, in response to receiving the approval from the user, the recurring payroll tasks comprising:
a second plurality of automatic recurring salary payments to each employee of the business entity according to the salary payment schedule; and
a second plurality of automatic recurring payroll tax deposits each comprising an adjusted payment to the tax agency according to the adjusted payment schedule of the tax agency,
wherein the second plurality of automatic recurring salary payments and the second plurality of automatic recurring payroll tax deposits are performed without further user intervention subsequent to the one time authorization and the approval from the user; and
a repository storing the payment schedule of the tax agency.

9. The system of claim 8,
wherein the user module is further configured to obtain a payroll parameter from the FMA, and
wherein the payroll analyzer is further configured to determine the payment schedule of the tax agency based on the payroll parameter and the compliance rule of the tax agency.

10. The system of claim 9,
wherein the update results from at least one selected from a group consisting of a new employee hiring and a salary adjustment.

11. The system of claim 9, the payroll analyzer further configured to:
estimate a withholding amount for the tax agency based on the update;
determine a pre-determined threshold based on the compliance rule of the tax agency; and
compare the withholding amount and the pre-determined threshold to generate a comparison,
wherein the schedule changing event is detected based on the comparison.

12. The system of claim 9,
wherein the user module is further configured to:
send, prior to withholding any payroll tax related to the update, a notification to the user, wherein the notification comprises the adjusted payment schedule of the tax agency and an amount of the payment to the tax agency; and
receive the approval from the user in response to sending the notification, and
wherein the payment module is further configured to:
access a payroll tax paying website of the tax agency; and
make the payment, in response to withholding a payroll tax related at least to the update, to the tax agency using the payroll tax paying website in response to receiving the approval from the user.

13. The system of claim 9,
wherein the payroll analyzer is further configured to determine a reporting schedule of the tax agency based on the update and the compliance rule of the tax agency;
wherein the user module is further configured to:

send a notification to the user, wherein the notification comprises the reporting schedule of the tax agency and a payroll tax report; and
receive the approval from the user in response to submitting the adjusted payment schedule of the tax agency and sending the notification, and
wherein the payroll agent further comprises a reporting module configure to:
access a payroll tax filing website of the tax agency; and
submit the payroll tax report to the tax agency using the payroll tax filing website in response to receiving the approval from the user.

14. A non-transitory computer readable medium storing instructions for processing a payroll of a business entity, the instructions when executed by a computer comprising functionality to:
obtain a compliance rule of a tax agency regarding the payroll, wherein the compliance rule of the tax agency relates to a payment to the tax agency according to a payment schedule of the tax agency;
receive a salary payment schedule from a user; and
perform, based on a one-time authorization from the user, recurring payroll tasks comprising:
a first plurality of automatic recurring salary payments to each employee of the business entity according to the salary payment schedule; and
a first plurality of automatic recurring payroll tax deposits each comprising the payment to the tax agency according to the payment schedule of the tax agency,
wherein the first plurality of automatic recurring salary payments and the first plurality of automatic recurring payroll tax deposits are performed without further user intervention subsequent to the one time authorization;
obtain an update of an employee salary from a financial management application (FMA), wherein financial data of the business entity is managed using the FMA;
analyze the update based on the compliance rule of the tax agency to detect a schedule changing event;
adjust the payment schedule of the tax agency based on the schedule changing event to generate an adjusted payment schedule of the tax agency;
submit the adjusted payment schedule of the tax agency to the user for approval; and
further perform, in response to receiving the approval from the user, the recurring payroll tasks comprising:
a second plurality of automatic recurring salary payments to each employee of the business entity according to the salary payment schedule; and
a second plurality of automatic recurring payroll tax deposits each comprising an adjusted payment to the tax agency according to the adjusted payment schedule of the tax agency,
wherein the second plurality of automatic recurring salary payments and the second plurality of automatic recurring payroll tax deposits are performed without further user intervention subsequent to the one time authorization and the approval from the user.

15. The non-transitory computer readable medium of claim 14, the instructions when executed by the computer further comprising functionality to:
obtain a payroll parameter from the FMA; and
determine the payment schedule of the tax agency based on the payroll parameter and the compliance rule of the tax agency.

16. The non-transitory computer readable medium of claim 14, wherein the update results from at least one selected from a group consisting of a new employee hiring and a salary adjustment.

17. The non-transitory computer readable medium of claim 14, the instructions when executed by the computer further comprising functionality to:
   estimate a withholding amount for the tax agency based on the update of the payroll parameter;
   determine a pre-determined threshold based on the compliance rule of the tax agency;
   compare the withholding amount and the pre-determined threshold to generate a comparison; and
   detect the schedule changing event based on the comparison.

18. The non-transitory computer readable medium of claim 14, the instructions when executed by the computer further comprising functionality to:
   determine a reporting schedule of the tax agency based on the update and the compliance rule of the tax agency;
   submit the reporting schedule of the tax agency and a payroll tax report to the user for approval;
   access a payroll tax filing website of the tax agency; and
   submit the payroll tax report to the tax agency using the payroll tax filing website in response to receiving the approval from the user.

19. The non-transitory computer readable medium of claim 14, the instructions when executed by the computer further comprising functionality to:
   determine the adjusted payment based on the update; and
   submit the adjusted payment to the user for approval.

20. A non-transitory computer readable medium storing instructions for processing a payroll of a business entity, the instructions when executed by a computer comprising functionality to:
   obtain data to populate a financial management application (FMA) of a user, wherein the data comprises an employee salary of the business entity;
   receive a notification from a payroll agent regarding a payment to a tax agency; and
   provide an approval of the payment to the tax agency in response to receiving the notification,
   wherein the payroll agent executes on a central processing unit of the computer and is configured to:
      obtain a compliance rule of a tax agency regarding the payroll, wherein the compliance rule of the tax agency relates to the payment to the tax agency according to a payment schedule of the tax agency;
      receive a salary payment schedule from the user;
      perform, based on a one-time authorization from the user, recurring payroll tasks comprising:
         a first plurality of automatic recurring salary payments to each employee of the business entity according to the salary payment schedule; and
         a first plurality of automatic recurring payroll tax deposits each comprising the payment to the tax agency according to the payment schedule of the tax agency,
         wherein the first plurality of automatic recurring salary payments and the first plurality of automatic recurring payroll tax deposits are performed without further user intervention subsequent to the one time authorization;
      obtain an update of the employee salary from the FMA;
      analyze the update based on the compliance rule of the tax agency to detect a schedule changing event;
      adjust the payment schedule of the tax agency based on the schedule changing event to generate an adjusted payment schedule of the tax agency;
      submit the adjusted payment schedule of the tax agency to the user for approval; and
      further perform, in response to receiving the approval from the user, the recurring payroll tasks comprising:
         a second plurality of automatic recurring salary payments to each employee of the business entity according to the salary payment schedule; and
         a second plurality of automatic recurring payroll tax deposits each comprising an adjusted payment to the tax agency according to the adjusted payment schedule of the tax agency,
   wherein the second plurality of automatic recurring salary payments and the second plurality of automatic recurring payroll tax deposits are performed without further user intervention subsequent to the one time authorization and the approval from the user.

* * * * *